(No Model.)
F. J. DUSTIN.
LUGGAGE CARRIER FOR BICYCLES.
No. 466,064. Patented Dec. 29, 1891.
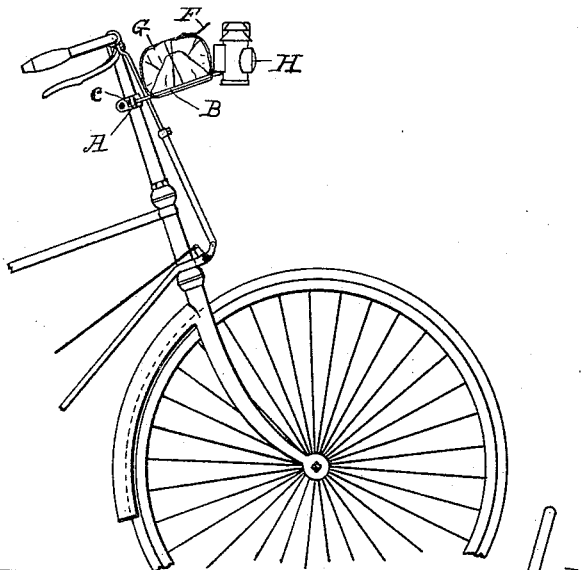
Fig. 1.
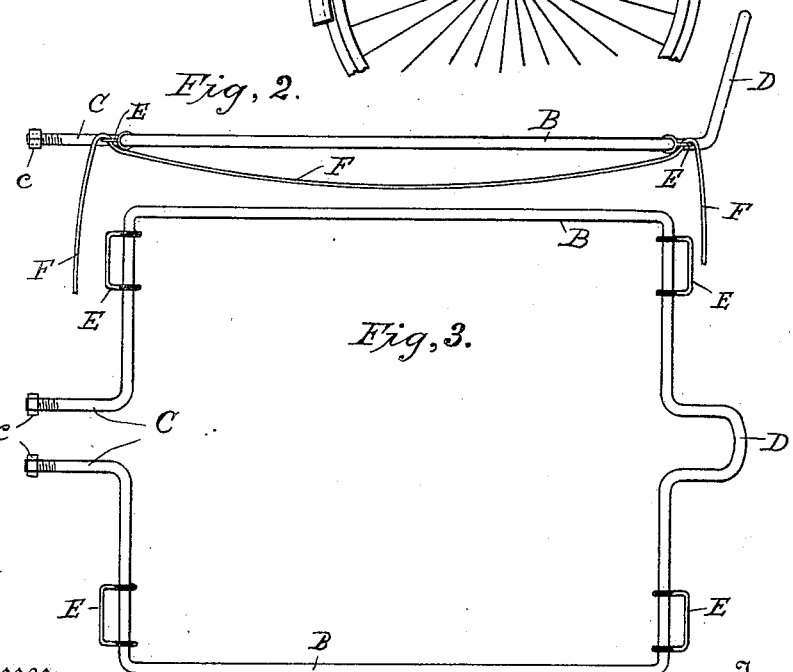
Fig. 2.
Fig. 3.
Witnesses
W. B. Hour
A. S. Heath
Inventor
Frank J. Dustin
By his Attorney J. S. Thurston

UNITED STATES PATENT OFFICE.

FRANK J. DUSTIN, OF MANCHESTER, NEW HAMPSHIRE, ASSIGNOR, BY DIRECT AND MESNE ASSIGNMENTS, TO HARRY E. WEBSTER AND A. J. LANE, OF SAME PLACE.

LUGGAGE-CARRIER FOR BICYCLES.

SPECIFICATION forming part of Letters Patent No. 466,064, dated December 29, 1891.

Application filed February 28, 1891. Serial No. 383,168. (No model.)

*To all whom it may concern:*

Be it known that I, FRANK J. DUSTIN, a citizen of the United States, residing at Manchester, in the county of Hillsborough and State of New Hampshire, have invented certain new and useful Improvements in Luggage-Carriers for Bicycles; and I do hereby declare the following to be a full, clear, and exact description of the invention, such as will enable others skilled in the art to which it appertains to make and use the same.

The object of this invention is to provide a detachable luggage-carrier for bicycles, combining economy and convenience in construction.

The invention consists of a frame formed of a single piece of wire having loops or guides for holding the necessary straps, and in the novel means of applying the same to a bicycle, all of which will be fully set forth in the following specification and claims, and clearly illustrated in the accompanying drawings, forming a part thereof, of which—

Figure 1 represents a broken elevation of a portion of a bicycle to which my improved luggage-carrier is attached, Fig. 2 being an enlarged detached view of my improved luggage-carrier. Fig. 3 is an enlarged plan view of the improved luggage-carrier having the binding-straps removed.

Similar letters of reference indicate corresponding parts.

All bicycles are provided with a lantern hook or carrier of some sort, and my improved luggage-carrier combines a lantern-hook, and is to be substituted in place of a lantern-hook upon a bicycle.

In Fig. 1 I show a portion of the forward part of a Safety bicycle, and upon this I show one form of attaching a lantern-hook, consisting in laterally-projecting ears A, of which there are two, one at each side. The lantern adapted for use in this case is simply a wire staple the ends of which are threaded and enter one into each of the ears A, projecting slightly beyond and behind, where nuts are applied to secure the hook in place.

My improved luggage-carrier is formed of a single piece of wire B, bent into a convenient form, its terminal ends C being threaded, if desired, and provided with nuts c, so as to be secured within the ears A in place of the ordinary lantern-hook. Opposite to the ends C, I form a lantern-hook D, as seen best in Fig. 2, and, as a means of securing the necessary straps F for binding luggage to the carrier B, metallic loops E are soldered or otherwise fastened to the carrier B, and straps F passed through the same, as seen best also in Fig. 2.

While I prefer to make the main portion or frame of the device rectangular, as shown in Fig. 3, it may be varied to suit the convenience, the only requirement being that it be expanded and be provided with means for securing the luggage upon it, and having a continuous lantern-hook projecting from one end of it and two separate retaining-points projecting from the opposite end. The lantern-hook is preferably bent up at an angle to the main portion to fit into the lamp-socket and hold it in position, while the main frame remains horizontal for the reception of the luggage, and the terminal points are capable of being moved or sprung from their normal position to be secured to the bicycle.

My improved carrier B, combining a lantern-hook, may be variously attached to a bicycle, and forms a very convenient and inexpensive device for the double purpose heretofore mentioned.

In Fig. 1 is seen a package G strapped to my improved carrier, and a lantern H, each being seen as in their normal position when on the road.

Having described my invention, what I claim is—

1. A combined luggage-carrier and lantern-hook for bicycles, consisting of a single wire frame the main portion of which is expanded and provided with means for attaching the luggage thereto, and one end of the frame being provided with a continuous hook and the opposite end with two separate retaining-points, substantially as described.

2. A combined luggage-carrier and lantern-hook for bicycles, comprising a single wire bent into a substantially rectangular shape, with an upwardly and forwardly projecting hook at one end and two retaining-points at the opposite end, metallic loops secured to the rectangular portion at opposite sides thereof and binding-straps through said loops, substantially as described.

In testimony whereof I affix my signature in presence of two witnesses.

FRANK J. DUSTIN.

Witnesses:
H. E. WEBSTER,
F. R. PARKER.